US006564248B1

(12) United States Patent
Budge et al.

(10) Patent No.: US 6,564,248 B1
(45) Date of Patent: *May 13, 2003

(54) E-MAIL SYSTEM WITH VIDEO E-MAIL PLAYER

(75) Inventors: Daniel C. Budge, Tualtin, OR (US); David Glass, Hillsboro, OR (US); Alvin Pivowar, Portland, OR (US); Mike Wells, Portland, OR (US); Robert Scheussler, Yorba Linda, CA (US)

(73) Assignee: Smith Micro Software, Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/456,770

(22) Filed: Dec. 7, 1999

Related U.S. Application Data

(63) Continuation of application No. 08/995,572, filed on Dec. 22, 1997, now Pat. No. 6,014,689.
(60) Provisional application No. 60/048,378, filed on Jun. 3, 1997.

(51) Int. Cl.$^7$ ................................................ G06F 13/00
(52) U.S. Cl. ....................... 709/206; 709/321; 709/329
(58) Field of Search ............................... 709/204, 206, 709/217, 219, 313, 328, 329, 321

(56) References Cited

U.S. PATENT DOCUMENTS

| 5,557,320 A |   | 9/1996  | Krebs |   |
|---|---|---|---|---|
| 5,748,499 A |   | 5/1998  | Trueblood |   |
| 5,781,901 A |   | 7/1998  | Kuzma |   |
| 5,832,208 A | * | 11/1998 | Chen et al. ................. | 713/201 |
| 5,951,638 A | * | 9/1999  | Hoss et al. ................. | 709/206 |
| 6,014,688 A | * | 1/2000  | Venkatraman et al. ...... | 709/206 |
| 6,014,689 A |   | 1/2000  | Budge et al. |   |

OTHER PUBLICATIONS

"Sender–Specified Multimedia Executable Object for Recipient Alert", IBM Technical Disclosure Bulletin, Apr. 1993, vol. 36, issue 4, pp. 247–248.*
Alaris Quick Video User's Manual, Copyright © 1996, 1997.
B eaver, John, *"New Version of Connectix Videophone for Windows Adds Support for Modems, Web–Based Address Book,"* Mar. 1996, http://baby.indstate.edu/CU–SeeMe/devl.\_archives/mar\_96/0130.html, 3 pages, alleged to be downloaded and printed from the World Wide Web on Jun. 29, 2001.
*"Alaris Videograms, the Java Centre, KooKoo, LapLink for Win95 . . . "* Netwatch Video Page, Issue 96–4, May 15, 1996, http://www.pulver.com/netwatch/nw/video.htm, 3 pages, alleged to be downloaded and printed from the World Wide Web on Aug. 31, 2001.
*"New Products, New Products, New Products, Byline: New Products,"* Computerworld, p. 69, Apr. 1, 1996.
Yamada, Ken, *"Alaris Technology Makes Video E–Mail— Little Video App Has Big Net Hopes."* Computer Reseller News, n 684, p. 64, May 20, 1996.

(List continued on next page.)

*Primary Examiner*—Viet D. Vu
(74) *Attorney, Agent, or Firm*—Knobbe, Martens, Olson & Bear, LLP

(57) ABSTRACT

Video messages are created in a manner that allows transparent delivery over any electronic mail (e-mail) system. The audio and video components of the message are recorded, encoded, and synchronously combined into a video message file. A player is selectively attached to the video message file to create an executable file which can be delivered as a standard binary file over conventional communications networks. To view the received video e-mail, the recipient executes the received file and the attached player automatically plays the video and audio message or the recipient executes the previously installed player which plays the video message.

51 Claims, 16 Drawing Sheets

OTHER PUBLICATIONS

Yoshida, Junko, "*Alaris Takes Aim At Compression Market.*" Electronic Engineering Times, 1996, n 905, p. 80, Jun. 10, 1996.

"CNET320.EXE," one of the files stored on the attached compact disk labeled "*SMICRO.004C1 IDS CD*," discussing an exemplary video email product from Alaris, Inc. and allegedly created or modified on Oct. 10, 1996.

"GINA.EXE,." one of the files stored on the attached compact disk labeled "*SMICRO.004C1 IDS CD*," as an example of a video email product from Alaris, Inc. and allegedly created or modified on Oct. 10, 1996.

"RICHARD.EXE," one of the files stored on the attached compact disk labeled "*SMICRO.004C1 IDS CD*," as an example of a video email product from Alaris, Inc. and allegedly created or modified on Oct. 10, 1996.

"*SMICRO.004C1 IDS CD*" No date.

"*SMICRO.004C1 IDS CD File Data*" No date.

"*SMICRO.004C1 IDS CD File Transcription*" No date.

"*COMPUTERWORLD*," press release of Cubic Video-Comm, Inc., Aug. 25, 1997, 1 page.

"*Auravision and Smith Micro*," press release in Apr. Videoconference News, Apr. 7, 1997, 2 pages.

CyberLink, "VideoLive MailPlus 3.0, User Manual," 59 pages, downloaded and printed from the World Wide Web on Aug. 1, 2000.

CyberLink, "CyberLink VideoLive Mail," http://www.cyberlink–usa.com/english/products/vlm.asp, 1 page, downloaded and printed from the World Wide Web on Aug. 1, 2000.

CyberLink, "Company Background," http://www.cyberlink–usa.com/english/home/company_bg.asp, 1 page, downloaded and printed from the World Wide Web on Aug. 1, 2000.

CyberLink, "Contacts," http://www.cyberlink–usa.com/english/contacts/cl_offices.asp, 2 pages, downloaded and printed from the World Wide Web on Aug. 1, 2000.

Fong Kai, "The Company," http://www.fkusa.com/company/homec.htm, 1 page, downloaded and printed from the World Wide Web on Aug. 1, 2000.*

Fong Kai, "Electronics," http://www.fkusa.com/zcam/sample.htm, 2 pages, downloaded and printed from the World Wide Web on Aug. 1, 2000.*

Fong Kai, "Contact Us," http://www.fkusa.com/contact.htm, 3 pages, downloaded and printed from the World Wide Web on Aug. 1, 2000.*

AverMedia, "AverMedia Home Page," http://www.aver.com, 1 page, downloaded and printed from the World Wide Web on Aug. 1, 2000.*

AverMedia, "Products," http://www.aver.com/products/tv98wremote.html, 4 pages, downloaded and printed from the World Wide Web on Aug. 1, 2000.*

All Products Online, "Products," http://www.allproduct.../search?lq+&q+query_by_select_item&qt+product%3D&pc_c0309030, 1 page downloaded and printed from the World Wide Web on Aug. 1, 2000.*

* cited by examiner

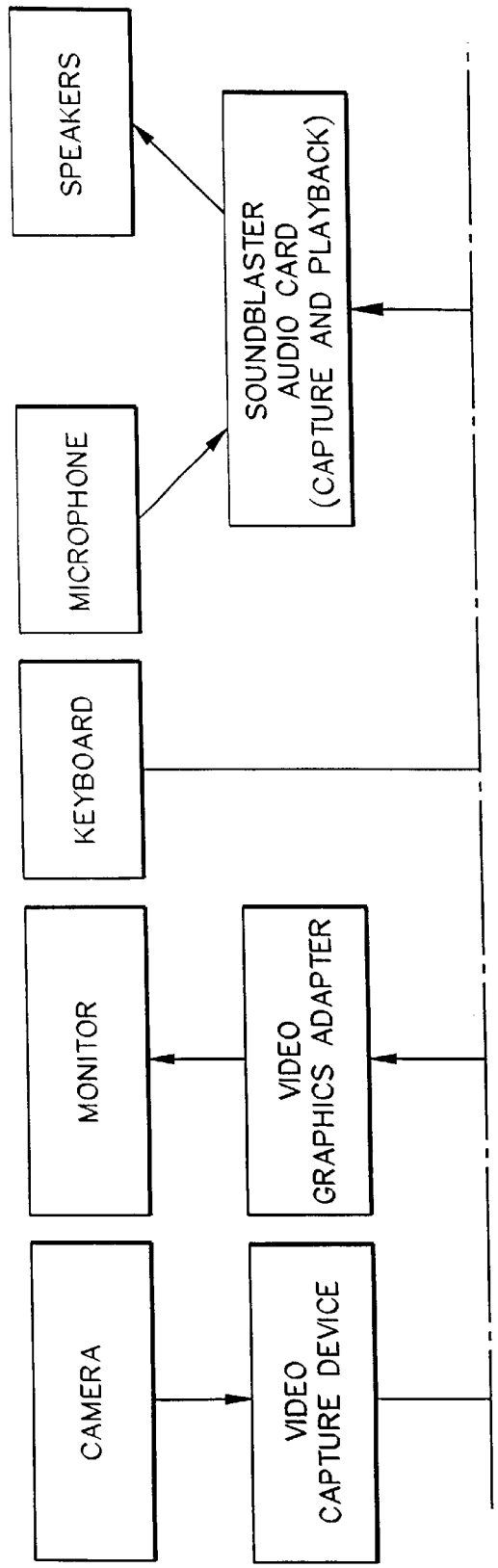

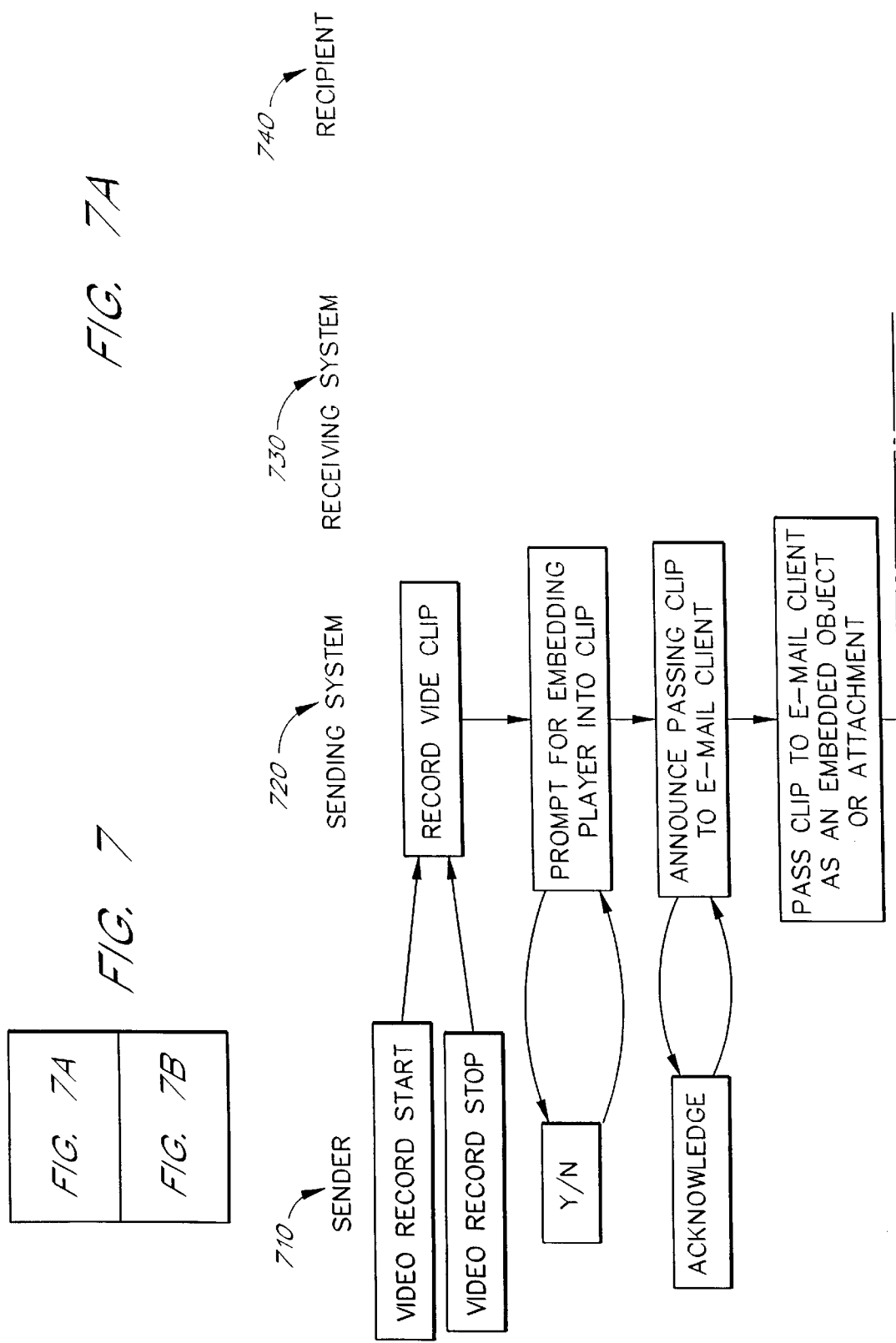

E-MAIL SYSTEM WITH VIDEO E-MAIL PLAYER

CROSS-REFERENCE TO RELATED APPLICATION

This application is a continuation of prior U.S. patent application Ser. No. 08/995,572, filed on Dec. 22, 1997, titled "E-MAIL SYSTEM WITH VIDEO E-MAIL PLAYER," now U.S. Pat. No. 6,014,689.

Pursuant to 35 U.S.C. §119(e), this application. claims the priority benefit of provisional application No. 60/048,378 filed Jun. 3, 1997.

BACKGROUND OF THE INVENTION

Electronic mail, or e-mail, stores messages and delivers them when the addressee is ready to receive them, in a so-called "store-and-forward" manner. The basic e-mail system consists of a front-end mail client and a back-end mail server. The e-mail client is a program running on an individual user's computer which composes, sends, reads, and typically stores e-mail. The e-mail server is a program running on a network server which the e-mail client contacts to send and receive messages. For example, INTERNET e-mail utilizes a SMTP (Simple Mail Transport Protocol) mail server to send mail and a POP (Post Office Protocol) server to receive mail. To send e-mail, an e-mail client contacts an SMTP mail server which moves the message to a POP server where it is sorted and made available to the recipient. The recipient's e-mail client logs on to the POP server and requests to see the messages that have accumulated in the mailbox. Conventionally, e-mail communications involve the transfer of text. Text-only e-mail, however, does not utilize the full potential of this emerging form of communications.

SUMMARY OF THE INVENTION

One aspect of this invention is a sending subsystem and a receiving subsystem remotely interconnected with a communications link. The sending subsystem incorporates a processor which executes a video e-mail recorder program. "Video e-mail" contains audio and video, not just video. The recorder combines video from a video camera and audio from a microphone into a message file. The message file can optionally incorporate a video e-mail player program. This message file is then transferred from the sending subsystem to the receiving subsystem over the communications link. The receiving subsystem has a video monitor and a speaker. The receiving subsystem also incorporates a processor which executes the video e-mail player program obtained from the message file or otherwise preloaded into the receiving subsystem processor. The player separates the video and audio portions of the message from the message file, causing the video portion to be displayed on the monitor and the audio portion to be played on the speaker.

Another aspect of this invention is a video e-mail recorder. The recorder incorporates a video encoder, an audio encoder, and a video/audio multiplexer. The video encoder processes video data at its input, generating encoded video data at its output. The audio encoder processes audio data at its input, generating encoded audio data at its output. The multiplexer combines the encoded video and encoded audio so that these portions of a video e-mail message remain synchronized in time relative to each other, resulting in a multiplexed multimedia data output. A recorder manager controls these various recorder components to create video e-mail messages.

Yet another aspect of this invention is a video e-mail data file. The data file includes encoded data packets, and for each data packet there is a type indicator associated therewith designating the data packet as having either encoded audio data or encoded video data, and a video e-mail player selectively attached to the data file. The player is in an executable format such that execution of the video e-mail file causes execution of the player. The player includes a demultiplexer, an audio decoder, and a video decoder. Each encoded data packet contains a portion of a video e-mail message and is routed by the demultiplexer to either the audio decoder or the video decoder depending on the type indicator, which designates the data packet as having either encoded audio data or encoded video data.

Still another aspect of this invention is a graphical user interface which provides visual information for the creation of video e-mail messages. The graphical user interface includes a display and a virtual video cassette recorder, both responsive to user inputs. The display selectively provides the user a view of either current video data or stored video data. The virtual video cassette recorder provides the user visual controls for storage of video data, as shown in the display, and retrieval of stored video data.

A further aspect of this invention is an improved video e-mail system. The system provides means for capturing a video image and an audio signal. The video image and audio signal are encoded and combined into a multimedia data file. Selectively attached to this data file is an executable video e-mail player. The video e-mail system provides a means for transferring this multimedia data file to an e-mail client for eventual transfer to an e-mail recipient.

One more aspect of this invention is a video e-mail method. A video message is generated at a sending location and a file is created from the video message. An executable player is attached to the file, which is sent over a communications link to a receiving location. The player is executed at the receiving location to retrieve the video message from the file.

BRIEF DESCRIPTION OF THE DRAWINGS

FIGS. 2, 2A–2C are a block diagram of the environment in which video e-mail software resides;

FIGS. 7, 7A–7B are a functional flow diagram of a video e-mail system;

DETAILED DESCRIPTION OF THE PREFERRED EMBODIMENT

The video e-mail system according to the present invention creates files of combined audio and video frames in the form of video e-mail files or self-contained executable video e-mail files. These audio-video files can be transmitted in any conventional manner that digital information can be transmitted. In a preferred embodiment, these audio-video files are electronic-mail (e-mail) ready and can be sent using any personal computer (PC) mail utility over the INTERNET or via on-line services such as America Online or CompuServe.

Figure 1:
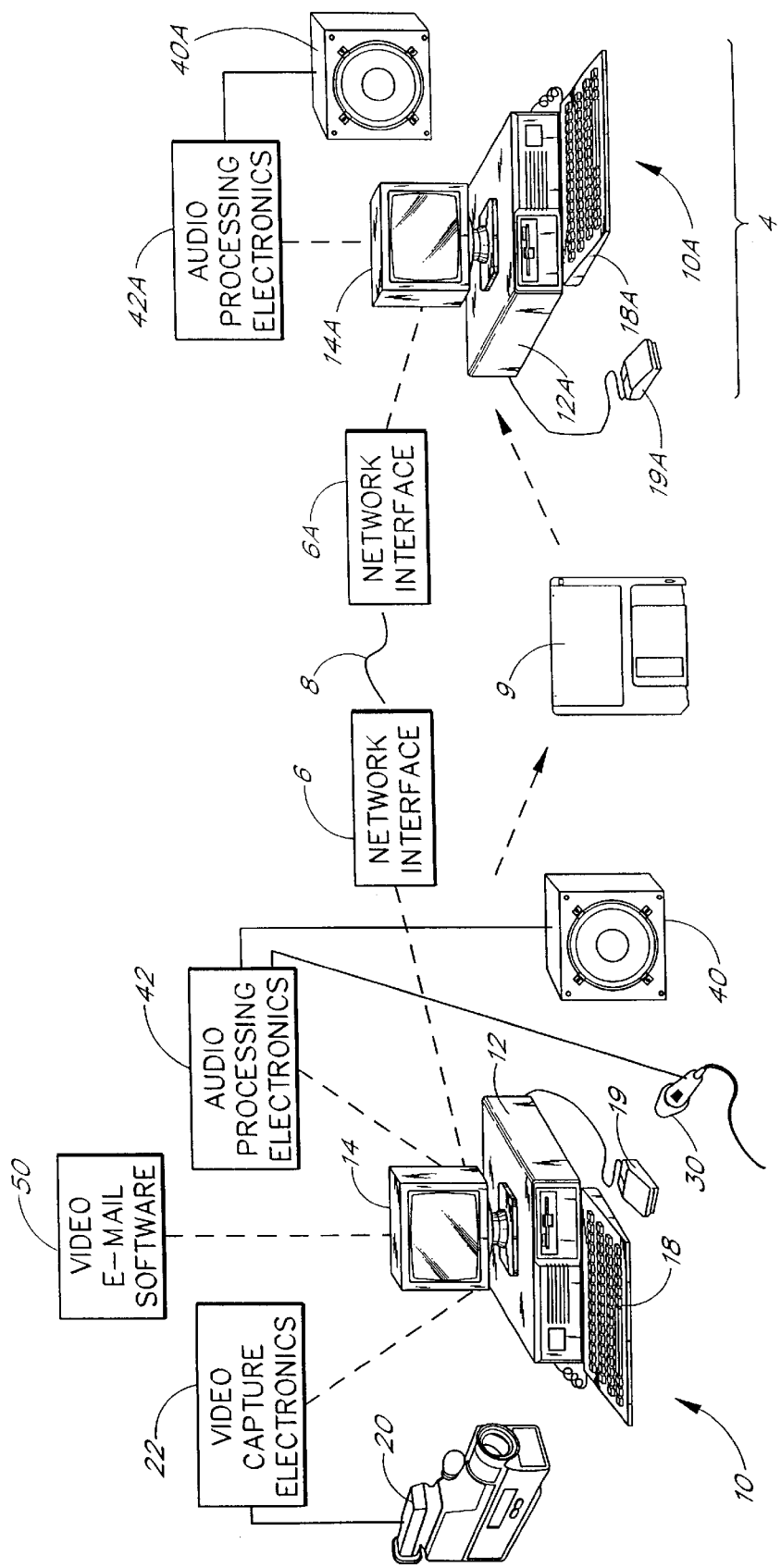
FIG. 1 is a block diagram illustrating a sending sub-system, communications link and a receiving sub-system for video e-mail.

FIG. 1 illustrates a preferred embodiment of the video e-mail sending sub-system 2 and receiving sub-system 4 and associated network interfaces 6 and communications link 8 according to the present invention. The sending sub-system 2 is based on a PC 10 having an enclosure 12 containing conventional PC electronics including a motherboard containing the CPU and associated chip set, bus, power supply and various interface and drive electronics, such as hard disk and video display controllers. The sending system also has a video display 14, a keyboard 18 and an input mouse 19. In addition, as is well known in the art, PC 10 may have other input and output devices not shown. A preferred PC for the sending system is a conventional "wintel" configuration based on Intel Corporation's family of microcomputer circuits, such as the 486 and PENTIUM family and Microsoft Corporation's WINDOWS operating systems such as WINDOWS 3.1, WINDOWS 95, or WINDOWS NT. One of ordinary skill will recognize, however, that the video e-mail system according to the present invention is compatible with a wide range of computer platforms and operating systems. In addition to operating system software, the sending system PC 10 executes video e-mail software 50 which provides for the creation of video e-mail messages and the transfer of those messages to a conventional e-mail client, such as EUDORA PRO 3.0 from Qualcomm Inc., San Diego, Calif.

In addition to standard PC peripherals, the sending sub-system 2 has a video input device 20, an audio input device 30 and an audio output device 40 to support the creation and review of video e-mail messages. The video input device 20 can be any image source, such as one of many types of video cameras, such as digital cameras, desktop video cameras, video camcorders, parallel-port cameras, and handycams. Some type of video input devices may require video capture electronics 22 which are typically contained on a single board within the PC enclosure 12 and mated with the bus provided on the PC motherboard.

The audio input device 30 can be any of various types of microphones or any sound source. The microphone 30 typically plugs into a sound card 42 which is contained in the PC enclosure 12 and mated with the bus provided on the PC motherboard. The sound card 42 provides analog-to-digital conversion for the microphone analog output and typically also provides an input amplifier for the microphone along with other audio processing electronics. The sound card also provides a digital-to-analog converter and audio output amplifiers to drive an audio output device 40. The audio output device 40 may be any of a variety of speakers, headphones, or similar voice or music-quality sound-reproduction devices. One of ordinary skill in the art will recognize that the video and audio data described above may be stored on various media, such as magnetic or optical disks, and input into the sending sub-system 2 through a corresponding storage media peripheral device, such as a disk drive or CD player.

The receiving sub-system 4 is also based on a PC 10A as described above for the sending sub-system 2. The receiving sub-system 4 includes a sound card 42A and a speaker 40A, as described above for the sending sub-system 2, in order to play back the audio portion of a received video e-mail. The receiving sub-system 4 also includes a video display device 14A, ordinarily a standard computer monitor, to play back the video portion.

A significant feature of the video e-mail system according to the present invention is that a video e-mail message is optionally sent with an attached executable video e-mail player, as described in detail below. As a result, the receiving sub-system 4 need only include conventional PC hardware and peripherals and execute conventional software, such as widely available Email client programs, in order to receive and playback received video e-mail messages.

Also shown in FIG. 1 are network interfaces 6, 6A and a communications link 8 connecting the sending and receiving systems. The communications link 8 may be any of a variety of communications channels which allow the transfer of digital data, such as Public Switched Telephone Network (PSTN), the INTERNET, local area networks (LANS), and wide area networks (WANS) to name a few. The network interfaces 6, 6A may be modem drivers, network adapter drivers, or terminal adapter drivers, for example.

Figure 2B:
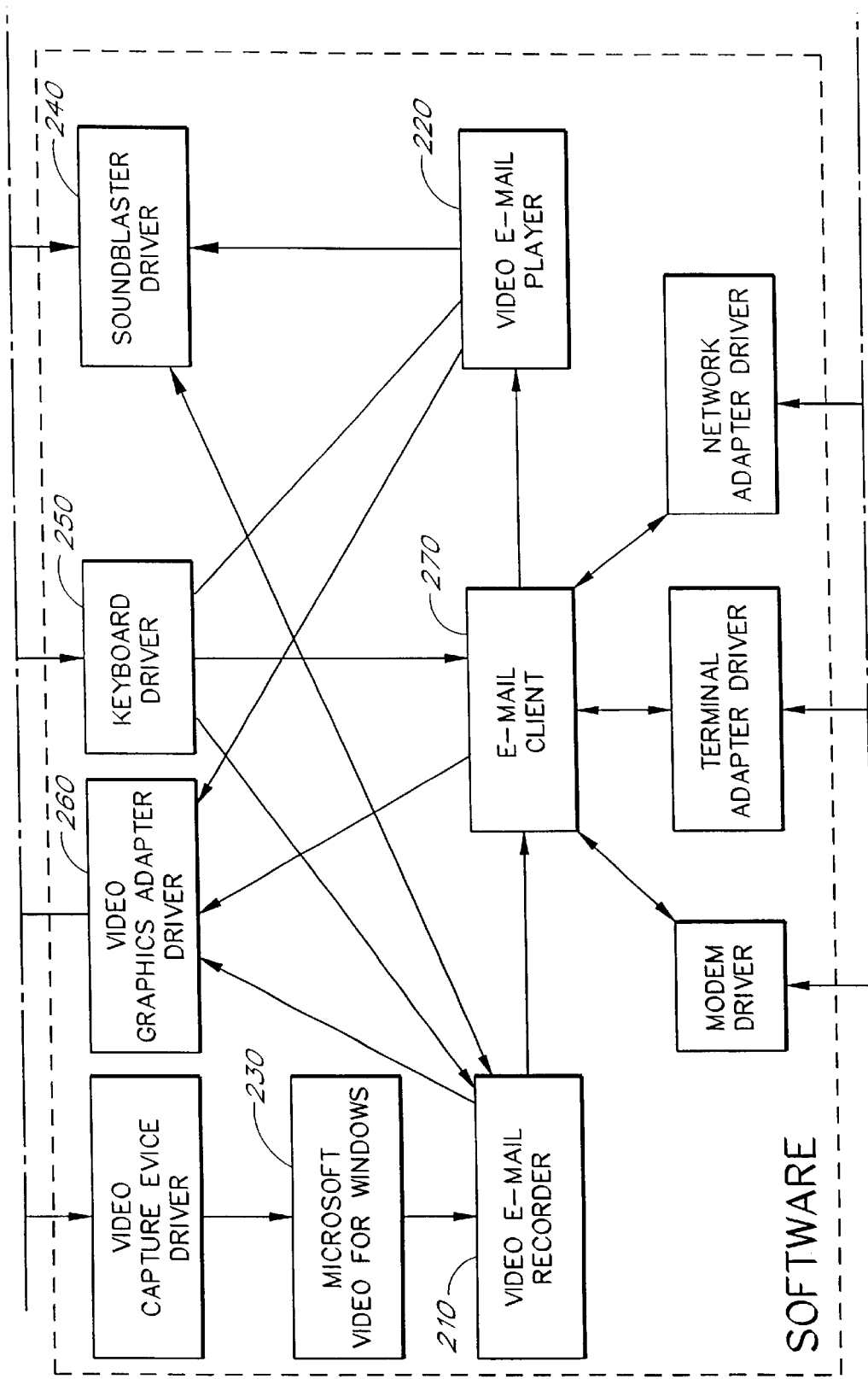
Figure 2C:
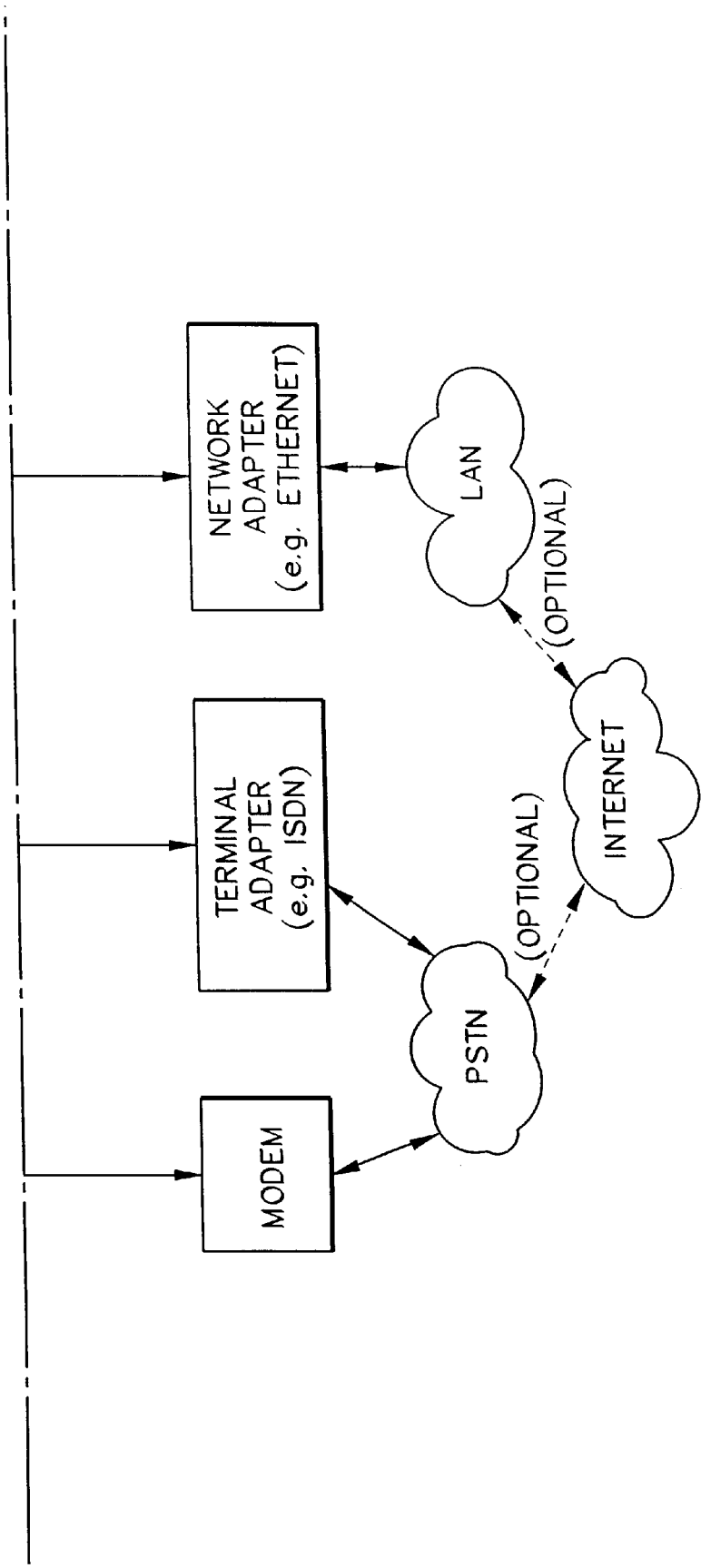

FIG. 2 illustrates the preferred embodiment of the environment in which the video e-mail software for the sending sub-system 2 and receiving sub-system 4 resides, as shown in FIG. 2B. The main software components of the video e-mail system are the video e-mail recorder 210 and the video e-mail player 220. The video e-mail recorder 210 receives as inputs video message data from the operating system video software 230, audio message data from the sound card driver 240, and user inputs from the keyboard driver 250. The video e-mail recorder 210 outputs user prompts to the video graphics-adapter driver 260. The video e-mail recorder 210 also executes the Email client 270 and passes the video e-mail file to the Email client 270.

The video e-mail player receives as inputs the video message file from the Email client 270 and user inputs from the keyboard driver 250. The video e-mail player 220 outputs video message data and user prompts to the video graphics-adapter driver 260 and audio message data to the sound card driver 240.

Figure 3:
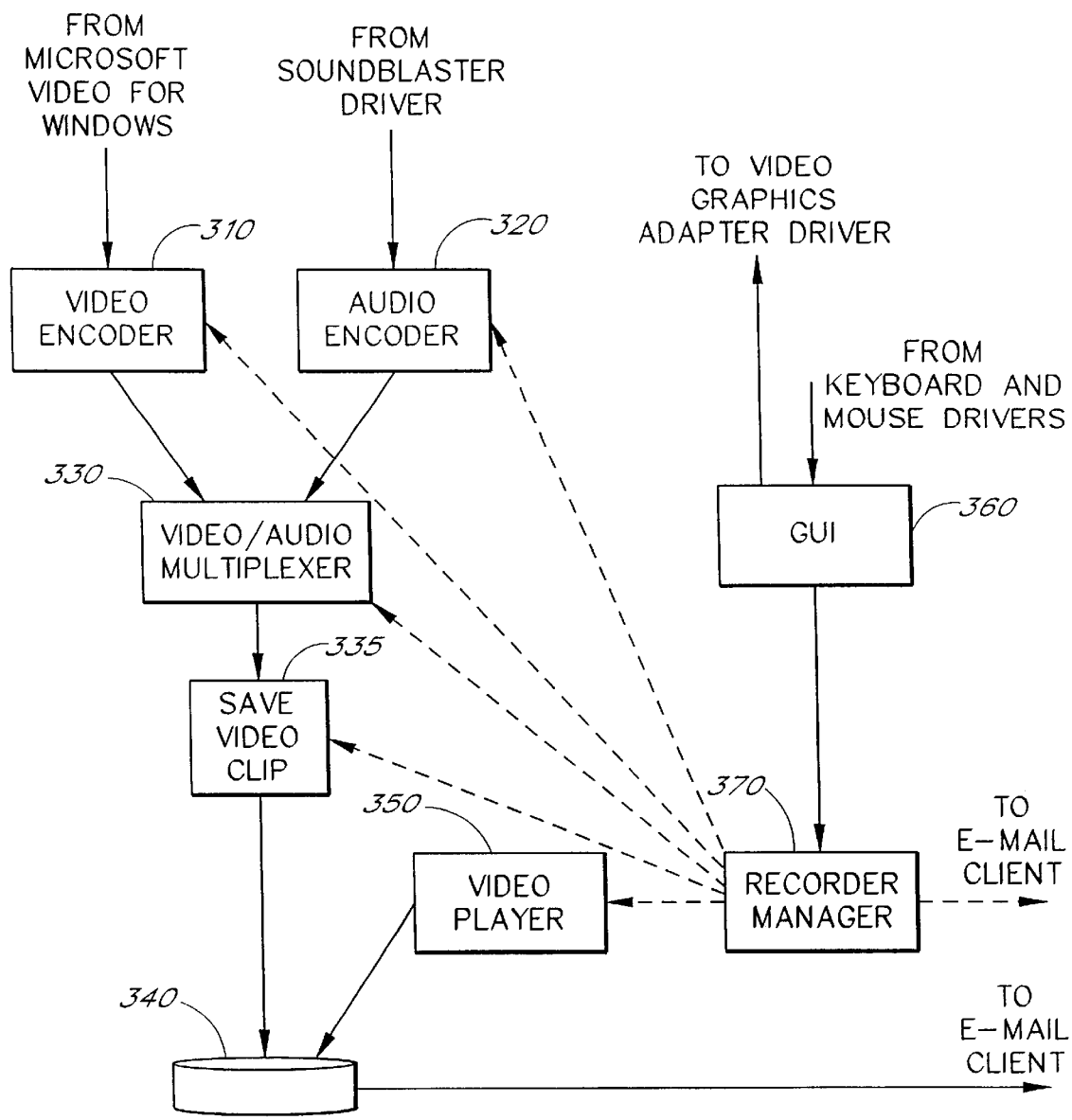
FIG. 3 is a block diagram of a preferred video e-mail recorder.

FIG. 3 shows a block diagram of a preferred embodiment of the video e-mail recorder 210. The recorder has a video encoder 310 which encodes and typically compresses video message data originating from a video input device and routed to the video encoder via the PC operating system video driver. The recorder also has an audio encoder 320 which encodes and typically compresses audio message data originating from an audio input device and routed to the audio encoder from the sound card driver. The encoded and typically compressed video and audio data streams are fed into a video/audio multiplexer 330 which places the video and audio data into a first-in-first-out (FIFO) buffer and multiplexes these data streams so as to maintain synchronism between the video and audio portions of the e-mail message. The multiplexer 330 stores the video e-mail clip or message 335 in a temporary file 340. The video player 350 optionally is appended to this temporary file 340 in executable form. The temporary file may reside on hard disk, floppy disk, memory, or any other storage media. A graphical user interface (GUI) 360 provides for user control of the recorder functions. A recorder manager 370 coordinates the various recorder functions and interfaces with the Email client software residing on the PC.

As described above, video e-mail messages are sent as video e-mail files or self-contained executable video files. The video e-mail player may reside on the receiving PC and, when executed, read the video e-mail file. Alternatively, the video e-mail player is transferred in executable form as an appended portion of the self-contained executable video file.

Figure 4:
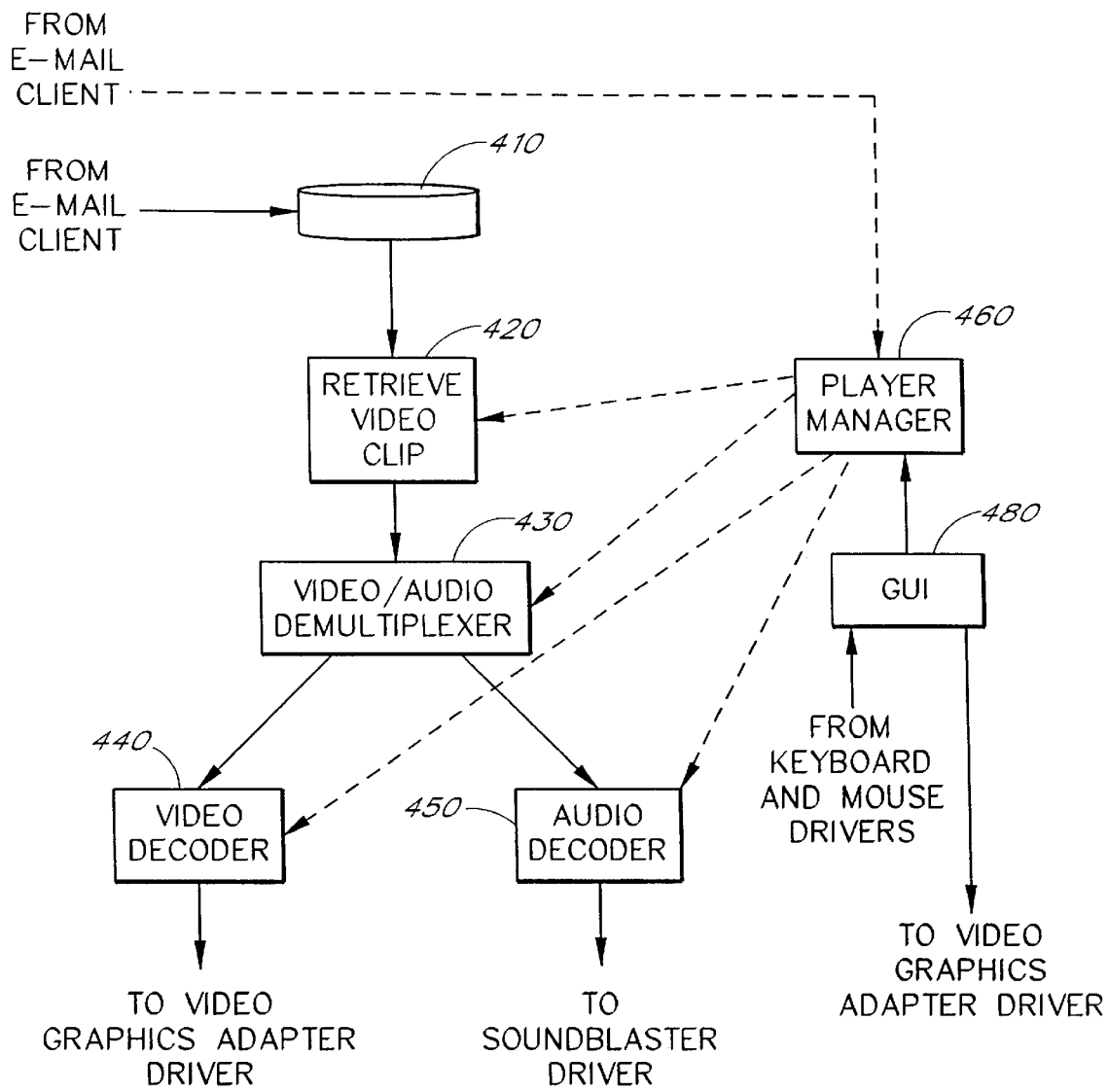
FIG. 4 is a block diagram of a preferred video e-mail player.

FIG. 4 shows a block diagram of a preferred embodiment of the video e-mail player 220. The player reads a video e-mail file 410, originating from the resident Email client. The player retrieves the video message, or clip, 420 from this video file. The player has a demultiplexer 430 which separates the video and audio data from the video file. The video data is decoded and typically decompressed with a video decoder 440 which transfers the video data to the video driver. The audio data is decoded and typically decompressed with an audio decoder 450 which transfers the audio data to the sound card driver. The various player functions are directed by the player manager 460. A graphical user interface (GUI) 480 provides for user control of the player functions.

Figure 5:
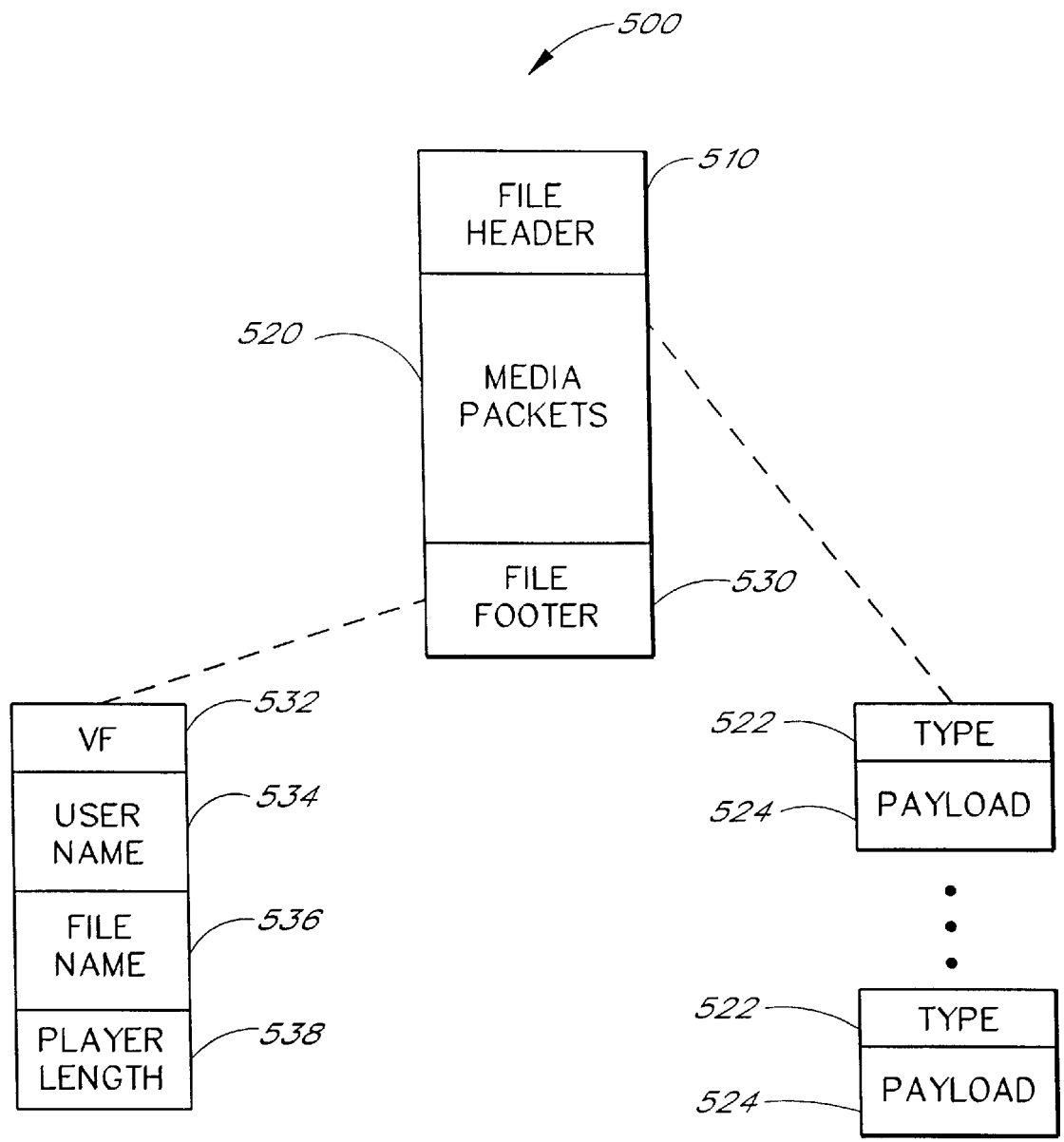
FIG. 5 illustrates a preferred video e-mail file format.

FIG. 5 illustrates a preferred embodiment of the video e-mail file. A video e-mail file 500 is made up of a file header 510, one or more media packets 520, and a file footer 530. If the video player is not embedded in the file, the file header is not present. Otherwise, the file header 510 is the executable stand-alone video player, which occupies 62020 bytes in a specific embodiment of this invention.

Each media packet 520 is made up of a type byte 522 and a payload 524. The type byte 522 is an ASCII "A" or "V," where "A" designates an audio packet and "V" designates a video packet. The payload 524 is variable in length. As an example, the payload is 18 bytes, a full frame, of CELP-encoded data if an audio packet is designated and 64 bytes, which could be partial or multiple frames, of H.261-encoded data if a video packet is designated.

The file footer 530 is made up of a "VF" field 532, a user name 534, a file name 536, and a player length field 538. The "VF" field 532 is the ASCII characters "V" and "F" in that order, indicating that this file 500 was generated by the video mail recorder of the present invention. The user name 534 is made up of 128 bytes of a null-delimited ASCII character string containing a name provided by the user who recorded the particular video e-mail contained in the file. The file name 536 is 13 bytes of a null-delimited ASCII character string containing the name of the file, as provided by the video e-mail recorder. Player length 538 is a 32-bit unsigned value which designates the length in bytes (62020) of the executable video e-mail player if embedded in this file. If the player is not present, this value is 0. The order of the bytes within this field is DCBA, where A is the most significant byte and D is the least significant byte. This byte order is sometimes referred to as "little-endian." For example, 62020 is $0000F244_{16}$. These bytes are stored as 44, F2, 00, 00.

Figure 6:
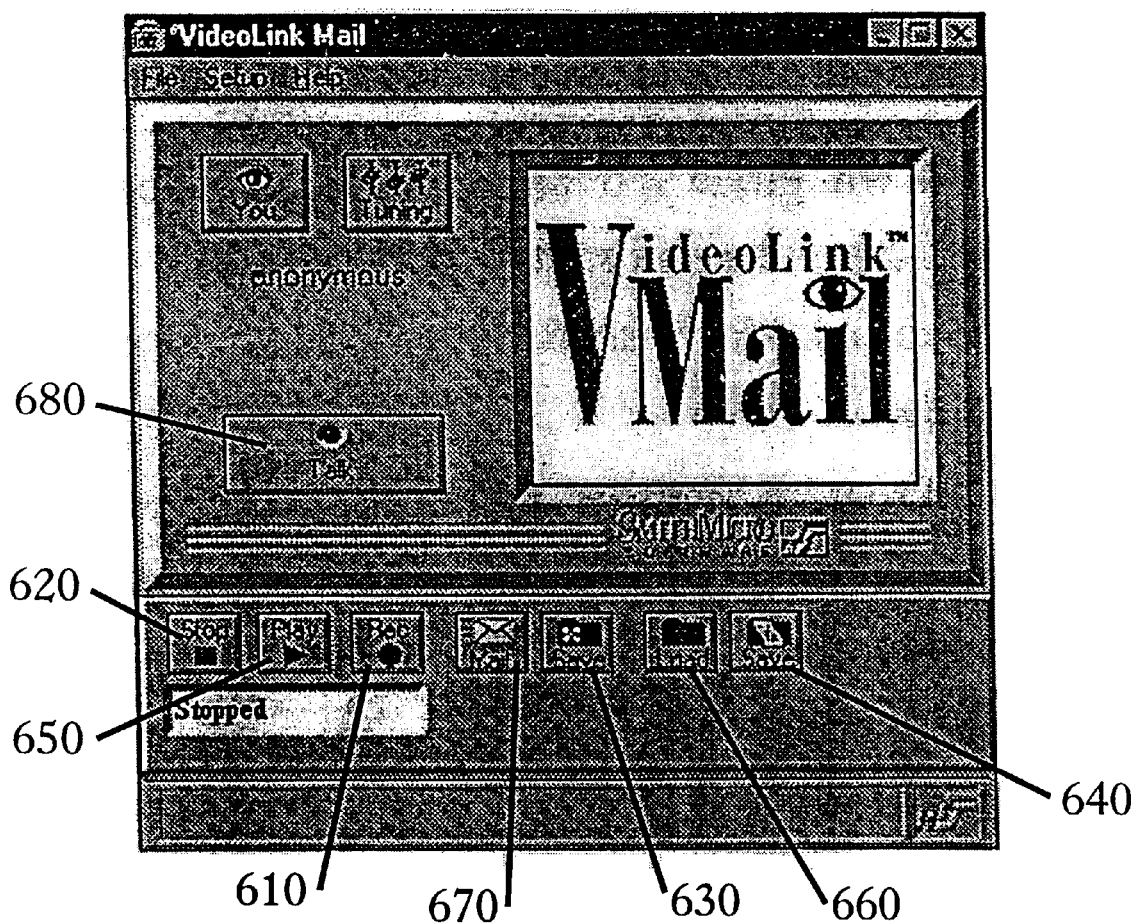
FIG. 6 illustrates a portion of a graphical user interface for video e-mail.

FIG. 6 illustrates a portion of the GUI for the preferred embodiment of the video e-mail recorder. This GUI provides a virtual VCR, whose controls appear to the user as shown in the bottom portion of FIG. 6. The virtual VCR allows the user to record and save both audio and video from the local camera and microphone interfaced to the user's PC. The operation of this virtual VCR is similar to that of a standard VCR. Control over the VCR is accomplished with virtual buttons provided on the VCR display.

To begin recording a video e-mail message, the RECORD button 610 is "pressed," that is, activated with a point and click operation of a mouse device, for example. Once started, the virtual VCR will continue to record until the STOP button 620 is pressed. As the recording is made, the video recorder stores video and audio data in a temporary file. If the SAVE VMail button 630 is pressed, this file is stored to hard disk along with the video e-mail player software 220. If the SAVE file button 640 is pressed, this file is stored to hard disk without the video e-mail player. The latter option assumes the video e-mail player software 220 is present on the receiving sub-system 4. As noted above, however, a significant feature of this invention is the ability to attach an executable version of the video e-mail player 220 to a video e-mail message file 500. This feature allows the receiving sub-system 4 to play a video e-mail message without the necessity of previously installing special software at the receiving sub-system 4, such as the video e-mail player 220.

The PLAY button 650 is pressed to watch a previously recorded message. The LOAD button 660 allows a user to select which stored message to watch. The MAIL button 670 is pressed to immediately send a recorded message. Voice recording is either voice activated or activated in a push-to-talk mode by pressing the TALK button 680.

Figure 7B:
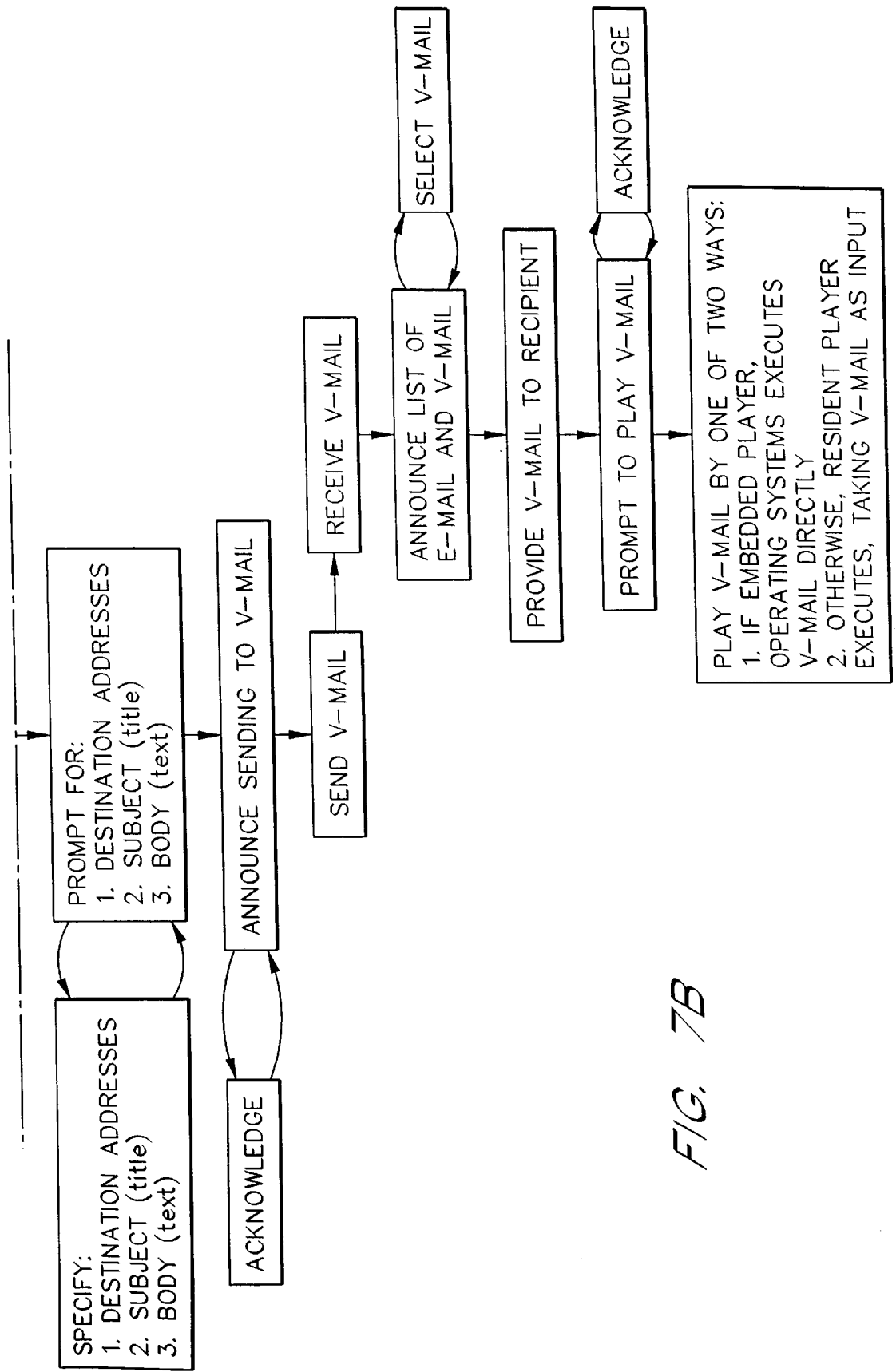

FIGS. 7A and 7B provide a functional flow overview of both the sending and receiving portions of the video e-mail system as described above. The sending user 710 receives prompts and provides inputs to the sending system 720 with respect to controlling the virtual VCR, embedding the video e-mail player 220 into the video e-mail message file 500, and controlling the Email client. The sending system 720 creates and transmits a video e-mail message to the receiving system 730. The recipient user 740 receives prompts and provides inputs to the receiving system 730 with respect to selecting and playing the video e-mail message.

Figure 8:
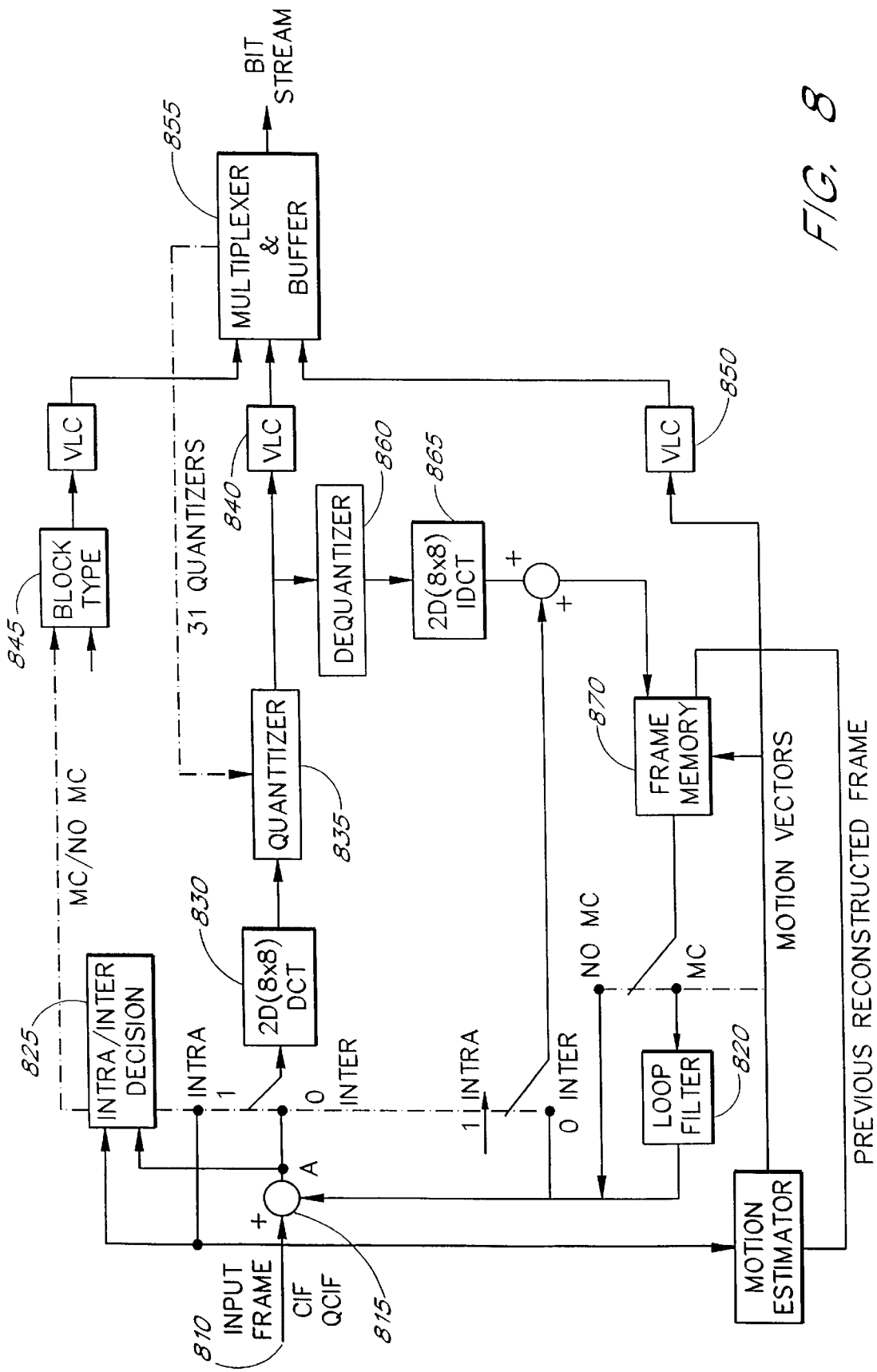
FIG. 8 is a block diagram of a preferred H.261 video encoder for a video e-mail recorder.
Figure 9:
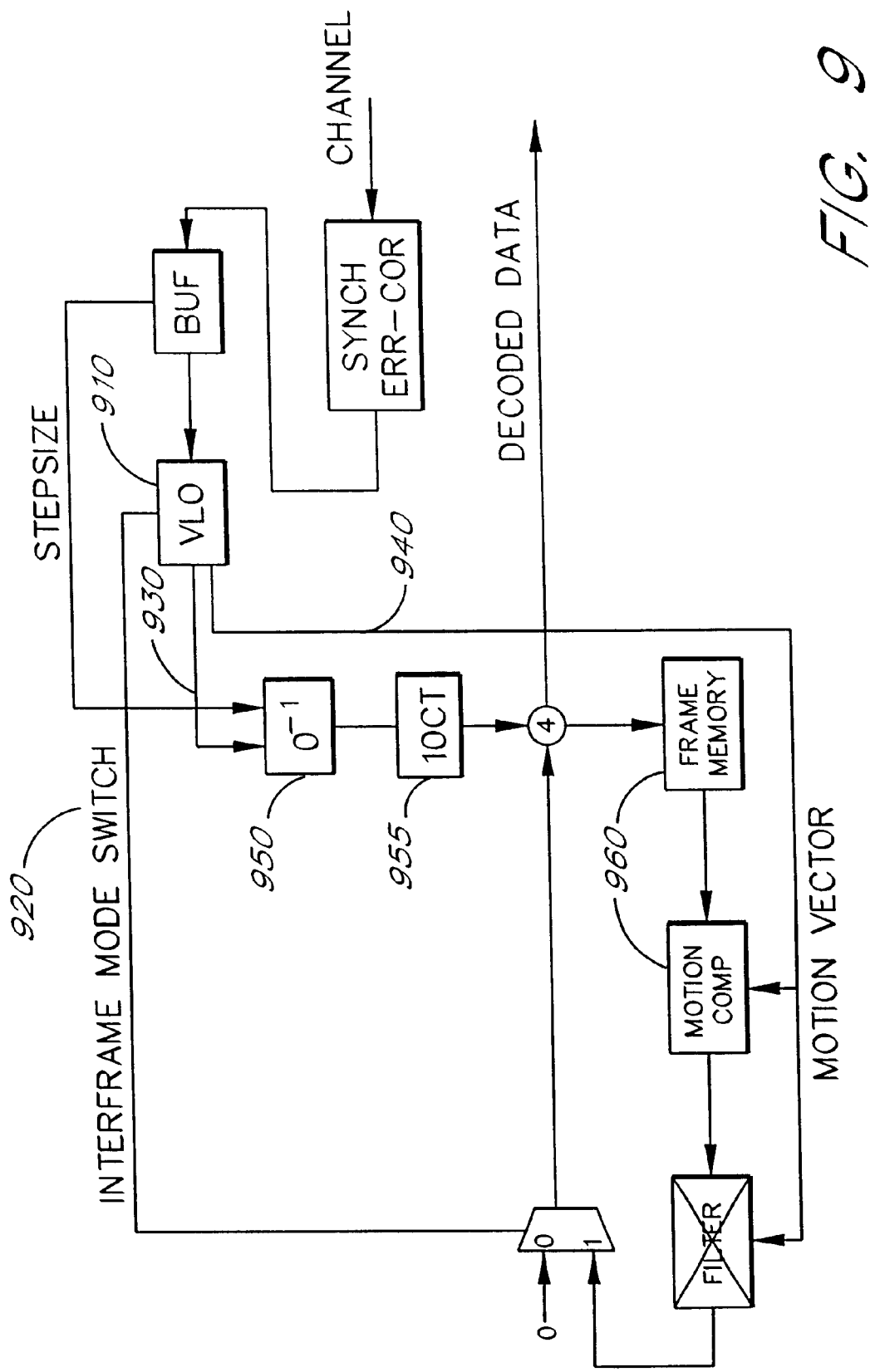
FIG. 9 is a block diagram of a preferred H.261 video decoder for a video e-mail player.
Figure 10:
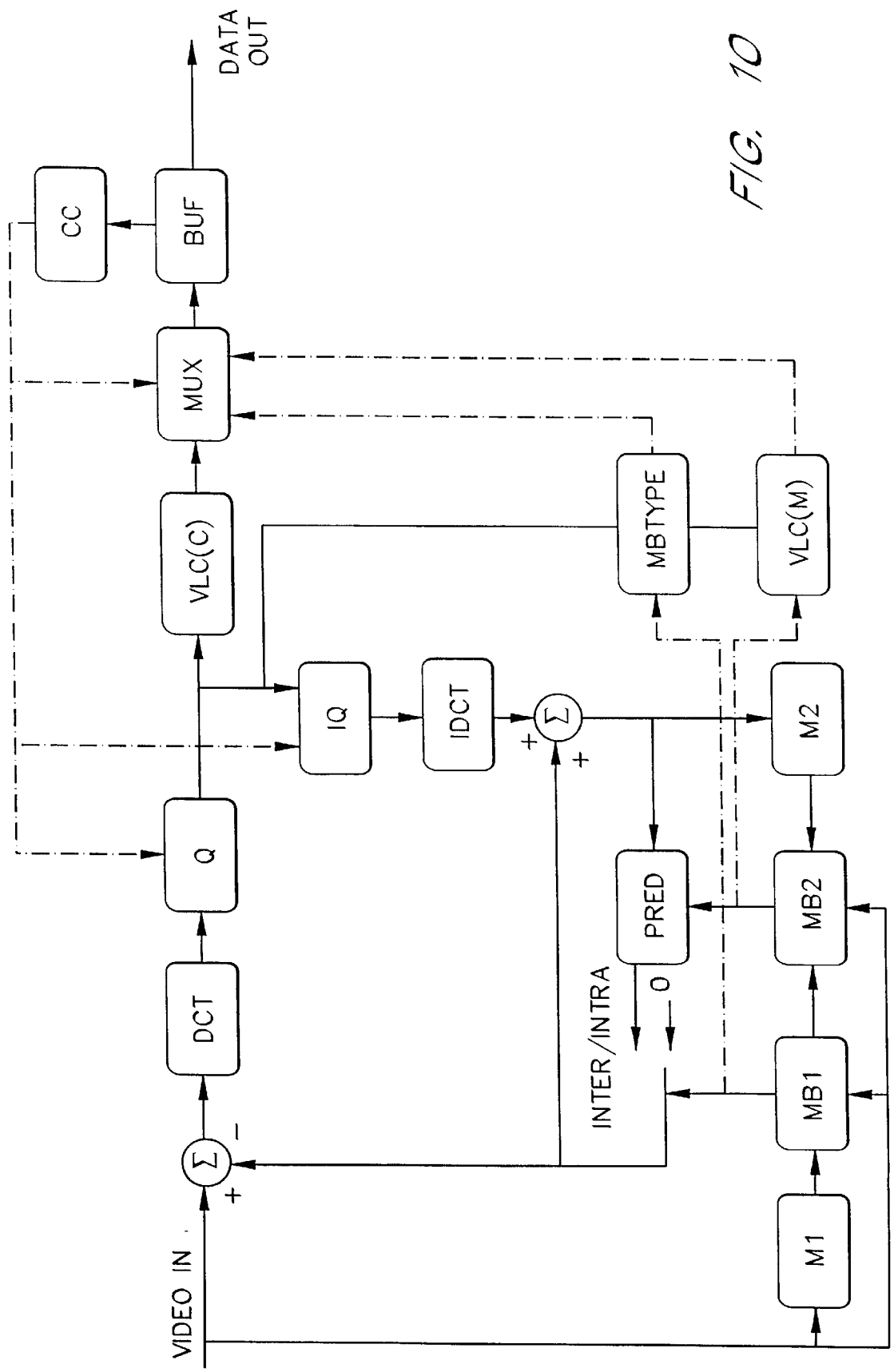
FIG. 10 is a block diagram of a preferred H.263 video encoder for a video e-mail recorder.
Figure 11:
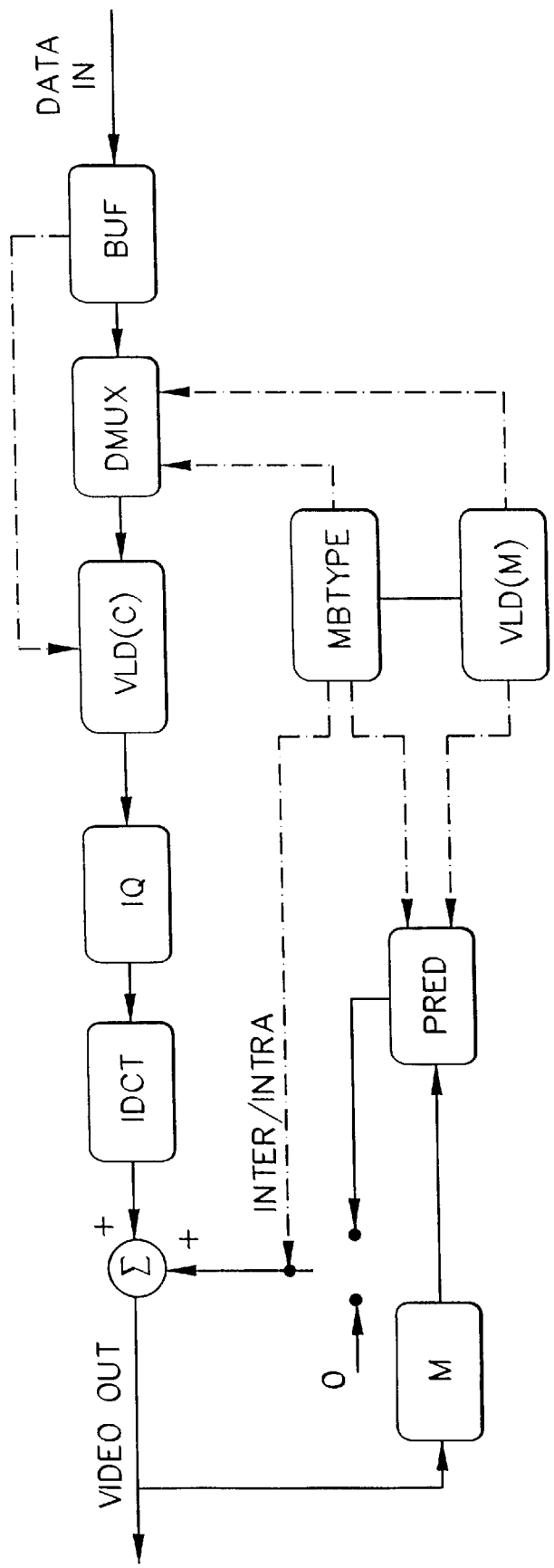
FIG. 11 is a block diagram of a preferred H.263 video decoder for a video e-mail player.

FIGS. 8–11 illustrate the preferred embodiments of the video codecs, i.e. the video encoder 310 and video decoder 440. These codecs are based on public standards. These standards are H.261 and H.263, both from the International Telecommunication Union (ITU). FIG. 8 is a block diagram for a preferred embodiment of a video encoder based on the H.261 standard. This encoder is described in "Techniques and Standards for Image, Video, and Audio Coding," by K. R. Rao and J. J. Hwang, Prentice Hall (ISBN 0-13-309907-5). FIG. 9 is a block diagram showing a preferred embodiment of a H.261 video decoder, also described in the Rao and Hwang reference. FIGS. 10 and 11 are block. diagrams of preferred embodiments of a H.263 video encoder and a H.263 video decoder, respectively. These, too, are described in the Rao and Hwang reference. Although not a part of this invention, one of ordinary skill in the art will recognize that various specific implementations of the functions shown in FIGS. 8–11 are possible.

Referring to FIG. 8, the encoder function can be described on a per-macroblock basis. The current macroblock is extracted from the input frame 810, which can be in one of two size formats, Common International Format (CIF) and Quarter CIF (QCIF). A Motion Estimator 812 uses the current macroblock and the reconstructed prior frame from a Frame Memory 870 to determine candidate motion vectors which, approximately, minimize the sum of absolute differences between the motion compensated prior frame and the current macroblock. These differences are computed by an adder 815. An Intra/Inter Decision 825 is made based on the variance of the differences computed by the adder 815. A large variance implies scene change or fast motion, and inter-picture prediction, even with motion estimation, can be ineffective. Hence, if the variance is large, the macroblock is sent Intra, i.e. with intra-picture correlation reduction only. If the variance is small, the macroblock is sent Inter, i.e. with inter-picture prediction. Additionally, according to the H.261 specification, the macroblock is sent Intra without regard to anything else if it has not been sent Intra in the last 132 frames. If the macroblock is sent Intra, the original macroblock is transformed by the discrete cosine transform (DCT) 830. If it is sent Inter, the differences from the adder 815 are transformed by the DCT. The transformed macroblock is quantized using a user-selected quantizer 835. The transformed and quantized coefficients are encoded using the variable length codes (VLC) 840 given in the H.261 specification for these coefficients. The macroblock type 845 is determined by the results of the Intra/Inter decision and, if Inter, the results of the Motion Estimator 812. The macroblock type is encoded with the VLC 847 given in the H.261 specification for macroblock types. If the macroblock is determined to be Inter, the motion vectors are encoded using the VLC 850 given in the H.261 specification for motion vectors. The various codes are transmitted in the order given in the H.261 specification 855. The transformed and quantized coefficients are de-quantized 860 and inverse transformed 865. If the macroblock was determined Intra, the results of the inverse transform are stored as is in the Frame Memory 870 for the reconstructed current macroblock. If the macroblock was determined Inter, an adder 867 adds the results of the inverse transform to the motion compensated reconstructed prior frame and stores this in the Frame Memory 870 for the reconstructed current macroblock.

Referring to FIG. 9, the decoder function can be described on a per-macroblock basis. The input bitstream 902, consisting of variable length codes, is buffer 904 and provided to the variable length decoder 910. The macroblock type is decoded from the bitstream to determine the mode switch control 920. The quantized transform coefficients are decoded 930. If the macroblock is Inter, the motion vectors are decoded 940. The transformed and quantized coefficients are de-quantized 950 and inverse transformed 955. If the macroblock is Intra, the results of the inverse transform 960 become the reconstructed current macroblock 965. If the macroblock is Inter, the results of the inverse transform 960 are added 970 to the motion compensated reconstructed prior frame 975 to form the reconstructed current macroblock 965.

Referring to FIG. 10, the H.263 encoder function can be described on a per-macroblock basis. The current macroblock is extracted from the input frame, M1 1005. Integer pixel motion estimation, ME1 1010, and half-pixel motion estimation, ME2 1015, use the current macroblock and the reconstructed prior frame, M2 1020, to determine candidate motion vectors which, approximately, minimize the sum of absolute differences (SAD) between the motion compensated prior frame and the current macroblock. These differences are computed by the adder 1025. The Intra/Inter decision is also made based on ME1 1010. Additionally, according to H.263 specification, the macroblock is sent Intra without regard to anything else if it has not been sent Intra in the last 132 frames. If the macroblock is sent Intra, the original macroblock is transformed by the DCT 1030. If it is sent Inter, the differences from the adder 1025 are transformed by the DCT 1030. The transformed macroblock is quantized using a user-selected quantizer 1035. The transformed and quantized coefficients are encoded 1040 using variable length codes for transform coefficients, VLC[C], given in the H.263 specification. The macroblock type is determined 1045 by the results of the Intra/Inter decision. If the macroblock is determined to be Inter, the motion vectors are encoded 1050 using the variable length codes for motion vectors, VLC[M], given in the H.263 specification. The various codes are transmitted via a multiplexer 1070 and buffer 1075 in the order given in the H.263 specification, as directed under coding control, CC 1080. The transformed and quantized coefficients are de-quantized, IQ 1055, and inverse transformed, IDCT 1060. If the macroblock was determined Intra, the results of the inverse transform are stored, as is, in the frame memory, M2 1020, for the reconstructed current macroblock. If the macroblock was determined Inter, the results of the inverse transform are added 1065 to the motion compensated reconstructed prior frame and stored in the frame memory, M2 1020, for the reconstructed current macroblock.

Referring to FIG. 11, the H.263 decoder function can be described on a per-macroblock basis. The input bitstream 1102, consisting of variable length codes, is transferred via a buffer 1110 and a demultiplexer 1120 to a variable length decoder for transform coefficients, VLD(C) 1130. The macroblock type is decoded 1125 from the bitstream. If the macroblock is Inter, a variable length decoder for motion vectors, VLD[M] 1140 is used. The transformed and quantized coefficients are de-quantized, IQ 1150, and inverse transformed, IDCT 1160. If the macroblock is Intra, the results of the inverse transform become the reconstructed current macroblock. If the macroblock is Inter, the results of the inverse transform are added 1170 to the motion compensated reconstructed prior frame, derived from the decoded frame store 1180 and predictor 1190 to form the reconstructed current macroblock.

Figure 12:
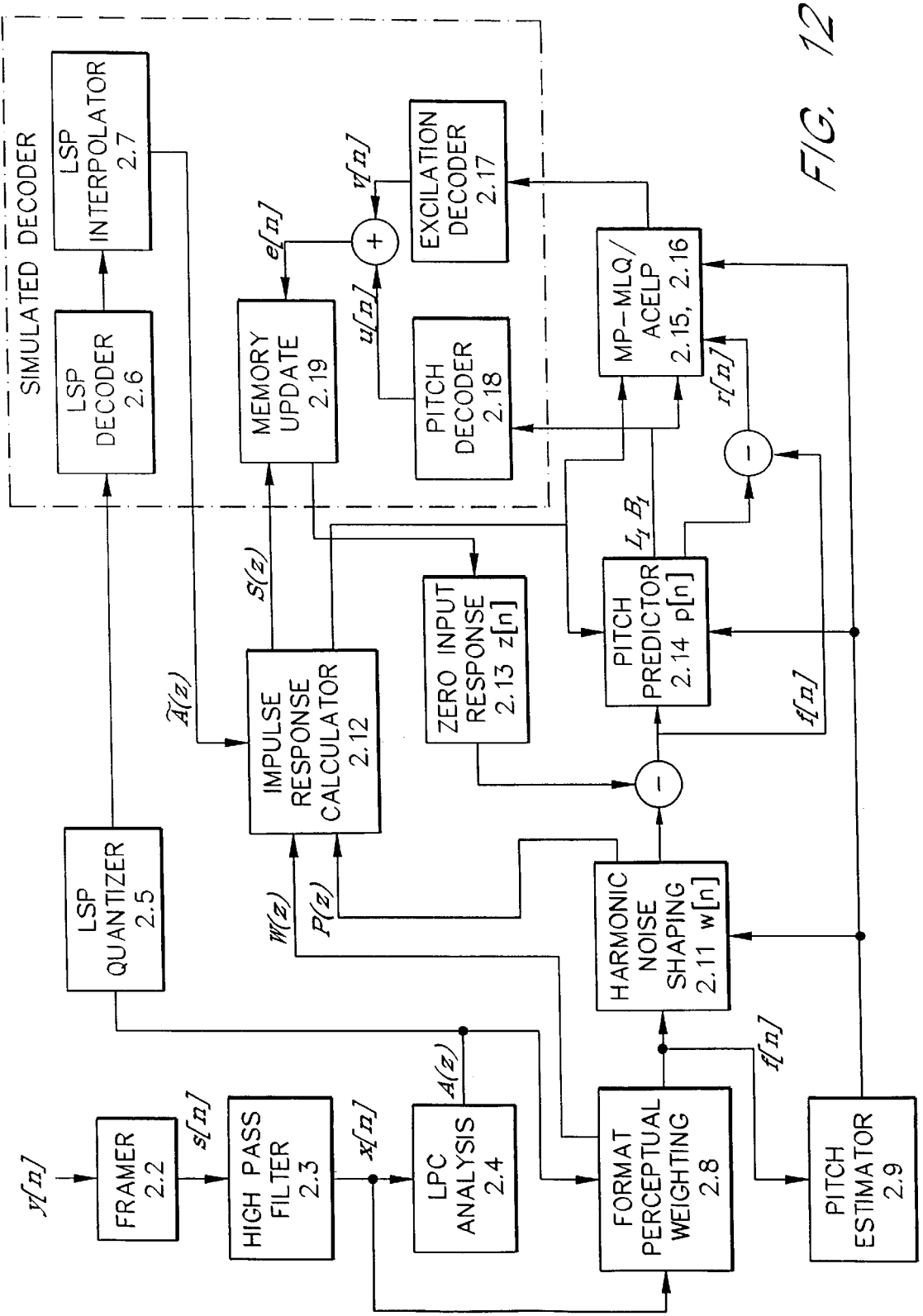
FIG. 12 is a block diagram of a preferred G.723 audio encoder for a video e-mail recorder.
Figure 13:
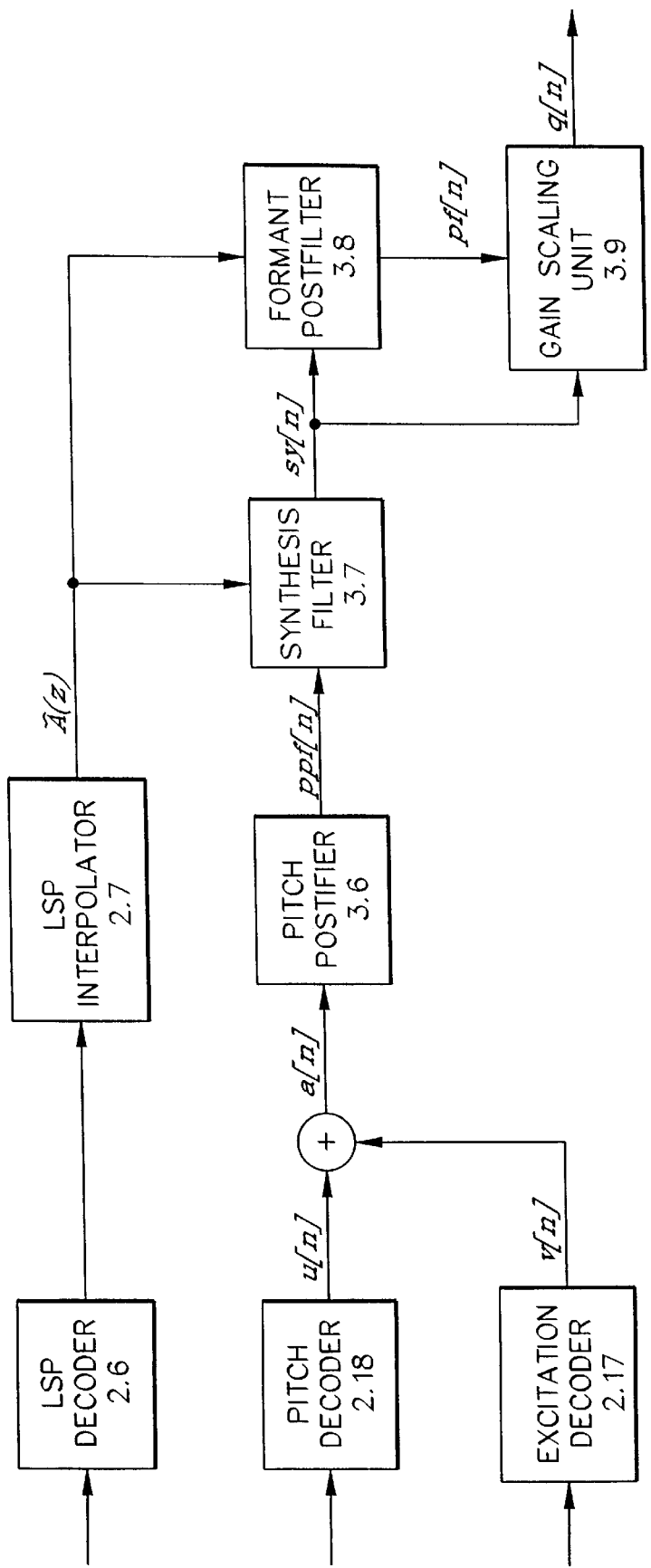
FIG. 13 is a block diagram of a preferred G.723 audio decoder for a video e-mail player.

FIGS. 12 and 13 illustrate the preferred embodiments of the audio codecs, i.e. the audio encoder 320 and the audio decoder 450. The preferred audio codecs are based on the G.723 and CELP standards. FIGS. 12 and 13 are block diagrams of the preferred G.723 audio encoder and G.723 audio decoder, respectively. These are described in the ITU standard of that name, specifically the Oct. 17, 1995 draft. The preferred CELP audio codecs are based on the Federal (DoD) standard number 1016. Although not a part of this invention, one of ordinary skill in the art will recognize that various specific implementations of the functions shown in FIGS. 12–13 are possible.

Referring to FIG. 12, the G.723 encoder function can be described on a per-frame basis. Frames consist of 240 samples of speech, y, at a sampling rate of 8 KHz. Thus, each frame covers a duration of 30 ms. These frames are further subdivided into subframes consisting of 60 samples each. The current frame, s, is extracted 1210 from the input speech, y. The DC component of the input frame is removed by a high-pass filter 1215, resulting in filtered speech, x. LPC coefficients, A, are determined by linear predictive coding analysis 1220 of the filtered speech, x. LSP frequencies are computed from the LPC coefficients, A, for sub-frame 3 and quantized 1225. The quantized LSP frequencies are decoded 1230. A full set of LSP frequencies for the entire frame are interpolated 1235 and a set of reconstructed LPC coefficients, Â, are computed. From the high-pass filtered speech, x, a set of formant perceptually weighted LPC coefficients, W, are computed. This filter 1240 is then applied to create the weighted speech signal, f. A pair of open loop pitch periods, L, are estimated 1245 for the frame, one for sub-frames 1 and 2, and the other for sub-frames 3 and 4. From the weighted speech, f, and pitch periods, L, a set of harmonic noise shaping filter coefficients, P, are computed. This filter 1250 is then applied to the weighted speech, f, to create the harmonic weighted vector, w. Using the reconstructed LPC coefficients, Ã, the formant perceptually weighted LPC coefficients, W, and the harmonic noise shaping coefficients, P, the combined impulse response, h, is computed 1255. Using the reconstructed LPC coefficients, Ã, the formant perceptually weighted LPC coefficients, W, and the harmonic noise shaping coefficients, P, the zero input response, z, is computed 1260 and subtracted 1265 from the harmonic weighted vector, w, to form the target vector, t. Using the vector, t, the impulse response, h, and the estimated pitch, L, the 85-element or 170-element adaptive code books are searched 1270 to determine the optimal pitch, L, gain, β, and corresponding pitch prediction contribution, p. The pitch prediction contribution, p, is subtracted 1275 from the target vector, t, to form the residual vector, r. Using the impulse response, h, and the optimal pitch, L, the residual vector, r, is quantized 1280, resulting in a pulse position index, ppos, pulse amplitude index, mamp, pulse position grid bit, grid, and pulse sign code word, pamp. Using ppos, mamp, grid and pamp, the pulse contribution, v, of the excitation is computed 1285. Using the results of the adaptive code book search, the pitch contribution, u, of the excitation is computed 1290. The two contributions, u and v, are summed 1294 to form the combined excitation, e. This is run through the combined filter determined by the reconstruction LPC coefficients, Ã, the format perceptually weighted LPC coefficients, W, and the harmonic noise shaping coefficients, P, forming the synthesis response. The synthesis response and the various filter coefficients are saved 1298 for use by the next frame.

Referring to FIG. 13, the G.723 decoder function can be described on a per-frame basis. The quantized LSP frequencies are decoded 1310. A full set of LSP frequencies for the entire frame are interpolated 1320 and a set of reconstructed LPC coefficients, Ã, are computed. Using the pulse position index, ppos, pulse amplitude index, mamp, pulse position grid bit, grid, and pulse sign code word, pamp, the pulse contribution, v, of the excitation is computed 1330. Using the results of the adaptive code book search, the pitch contribution, u, of the excitation is computed 1340. The two contributions, u and v, are summed 1350 to form the combined excitation, e. To this is applied the pitch post filter 1360 resulting in pitch-post-filtered speech ppf. Using the reconstructed LPC coefficients, Ã, the post-filtered speech ppf is filtered 1370 resulting in synthesized speech, sy. A formant post-filter 1380 is applied to the synthesized speech, sy, resulting in post-filtered speech, pf. At the same time, the energy, E, of the synthesized speech is computed. Using the energy, E, the gain of the post-filtered speech is adjusted 1390 forming the final speech, q.

The video e-mail apparatus and method according to the present invention has been disclosed in detail in connection with the preferred embodiments, but these embodiments are disclosed by way of examples only and are not to limit the scope of the present invention, which is defined by the claims that follow. One of ordinary skill in the art will appreciate many variations and modifications within the scope of this invention.

What is claimed:

1. Video e-mail software which enables encoded video, audio, and text to be transmitted over a digital network comprising:

a video encoder configured to be coupled to a video camera to generate encoded video data;

an audio encoder configured to be coupled to a microphone to generate encoded audio data;

a multiplexer in communication with said video encoder and said audio encoder and configured to generate multiplexed multimedia data comprising synchronously combined portions of said encoded audio data and said encoded video data;

software configured to provide review of the multimedia data, configured to launch an e-mail program without a user interacting with the e-mail program, configured to instruct the e-mail program to generate at least one video e-mail message ready for addressing and transmission, wherein the generation occurs without the user interacting with the e-mail program, and wherein the software is configured to provide a graphical user interface including a plurality of virtual buttons, each of which, when activated, initiates one of a plurality of specific operations to be performed by said software.

2. A video e-mail system comprising a computer program configured to execute on a processor to combine video from a video camera and audio from a microphone into a substantially compressed message file without storing comparatively large intermediate files to a disk, said program configured to optionally incorporate a video e-mail player into the message file.

3. The video e-mail system of claim 2, wherein said computer program comprises:

a video encoder configured to generate encoded video data;

an audio encoder configured to generate encoded audio data;

a video/audio multiplexer in communication with said video encoder and said audio encoder and configured to generate multiplexed multimedia data comprising synchronously combined portions of said encoded audio data and said encoded video data; and a recorder manager which provides control signals to said video encoder, said audio encoder, and said multiplexer so as to record the multimedia data.

4. The video e-mail system of claim 2, wherein said video e-mail player comprises:

a video/audio demultiplexer in communication with said message file and configured to separate an encoded video data packet and an encoded audio data packet from said message file;

a video decoder configured to accept said video data packet from said demultiplexer and to generate decoded video data to a video driver;

a audio decoder configured to accept said audio data packet from said demultiplexer and to generate decoded audio data to a sound driver; and a player manager which provides control signals to said demultiplexer, said video decoder, and said audio decoder so as to play the message file as a video e-mail message.

5. A video e-mail system, comprising:

a display which views video data;

video e-mail software which provides control for the review of said video data, said display and said video e-mail software being responsive to user inputs and providing a graphical user interface; and a processor which executes the video e-mail software and an e-mail client to generate within the e-mail client at least one video e-mail message having a video e-mail player and compressed video data, wherein the at least one video e-mail message is generated without a user interacting with the e-mail client and wherein the video e-mail player is configured to replay the compressed video data.

6. The video e-mail system of claim 5, wherein said graphical user interface further comprises a plurality of virtual buttons each, of which, when activated, initiates one of a plurality of specific operations to be performed by the video e-mail system.

7. A video e-mail system, comprising:
   means for capturing a video image;
   means for encoding and combining said video image and an audio signal into a substantially compressed multimedia data file;
   means for attaching an executable video e-mail player to said data file; and
   means for transferring said data file to an e-mail client for eventual transfer to a recipient without a user of the e-mail client having to interact with the e-mail client to attach the data file.

8. An e-mail system which enables encoded images, audio, and text to be transmitted over a digital network system comprising:
   a first encoder coupled to a camera to generate encoded data corresponding to images captured by the camera;
   a second encoder configured to be coupled to a microphone to generate encoded data corresponding to audible information captured by the microphone;
   a multiplexer in communication with said first and second encoders and configured to generate multiplexed multimedia data comprising combined portions of the encoded data from said first and second encoders, wherein the data is generated without a user preallocating disk drive storage space for storage of large intermediate files having data corresponding to the images or data corresponding to the audible information; and
   software which provides control for the review of current data, is responsive to user inputs, and provides visual information, thereby providing a graphical user interface including a plurality of virtual buttons, each of which, when activated, initiates one of a plurality of operations to be performed by said e-mail system, wherein the software also generates e-mail messages including an optionally-included video player configured to play the multiplexed multimedia data.

9. A video e-mail system comprising video e-mail software configured to generate a message file including video and audio data, and to attach the message file to an e-mail without interaction between a user and an e-mail software program configured to transfer the e-mail to a recipient, wherein said message file includes a player configured to play at least portions of one of said video and said audio data.

10. A video e-mail computer program which provides a data file to an e-mail computer program, the video e-mail computer program comprising:
    software instructions which create a graphical user interface configured, upon receipt of a user instruction, to begin recording multimedia data;
    software instructions which create a graphical user interface configured, upon receipt of a user instruction, to stop recording multimedia data;
    software instructions which create a graphical user interface configured, upon receipt of a user instruction, to play recorded multimedia data; and
    software instructions which create a graphical user interface configured, upon receipt of a user instruction, to pass a data file to an e-mail computer program to be automatically attached to a video e-mail, wherein the data file is usable by a player to play the recorded multimedia data.

11. The video e-mail computer program of claim 10, further comprising software instructions which create a graphical user interface configured, upon receipt of a user instruction, to selectively attach the player to the data file, the player being configured to play portions of the data file upon selection of the data file by a recipient of the video e-mail.

12. A video e-mail system comprising:
    video e-mail software which, when executed, controls the combination of encoded audio data and encoded video data into at least one multimedia data file and selectively passes the multimedia data file to an e-mail client for attachment to an e-mail, wherein the attachment occurs without a user of the video e-mail software interacting with the e-mail client; and
    a computer readable storage medium which stores the video e-mail software.

13. The video e-mail system of claim 12, wherein the video e-mail software further controls whether a player will be combined with the at least one multimedia data file.

14. The video e-mail system of claim 12, wherein execution of the video e-mail software allows for a combination of a player with the at least one multimedia data file.

15. The video e-mail system of claim 14, wherein the combination of the player with the at least one multimedia data file is selectable.

16. The video e-mail system of claim 12, wherein the at least one multimedia data file is compressed during generation and before being written to a computer readable storage medium, thereby avoiding generation of substantially larger intermediate data files.

17. The video e-mail system of claim 12, further comprising a processor which accesses and executes the video e-mail software.

18. The video e-mail system of claim 12, further comprising a camera which captures at least one of audio data or video data to be processed into at least one of the encoded audio data and encoded video data.

19. A method of generating an e-mail including an executable file which when selected, launches an attached player playing a video clip, the method comprising:
    combining an executable player with at least one of video data and audio data into a message file, wherein the executable player is configured to launch and play the at least one of video data and audio data when the message file is selected; and
    selectively passing the message file to an e-mail client for attachment to an e-mail, wherein the attachment occurs without a user interacting with the e-mail client, thereby generating an e-mail including the message file, and wherein the combining and selectively passing occur within a video e-mail software program.

20. The method of claim 19, wherein the combining occurs without storing to disk substantially larger intermediate data files.

21. The method of claim 20, wherein the substantially larger intermediate data files include AVI files.

22. The method of claim 19, wherein the combining combines audio data and video data with the executable player.

23. The method of claim 19, wherein the video data is substantially compressed.

24. The method of claim 19, wherein the audio data is substantially compressed.

25. A video e-mail system comprising video e-mail software which executes on a processor to control an audio encoder, a video encoder and a multiplexer to generate a video clip to be attached to an e-mail, wherein the video clip is much smaller in size than data supplied to the audio and video encoders, and wherein the video e-mail software does not store large intermediate files to a disk drive.

26. The video e-mail system of claim 25, wherein the video e-mail software also controls the combination of the video clip and an executable player configured to play the video clip, into a message file, and wherein the message file rather than the video clip is to be attached to an e-mail.

27. The video e-mail system of claim 25, further comprising a processor which executes the video e-mail software.

28. The video e-mail system of claim 25, further comprising a camera which captures the data.

29. The video e-mail system of claim 25, further comprising a computer readable medium which stores the video e-mail software.

30. The video e-mail system of claim 25, further comprising an e-mail client, and wherein the video e-mail software selectively passes the video clip to the e-mail client for attachment to an e-mail, wherein the attachment occurs without a user interacting with the e-mail client.

31. A method of generating an e-mail with a message file where the message file includes a video clip and an executable player, the method comprising:
    receiving audio and video data;
    compressing the audio and video data into a message file including an executable player designed to play the audio and video data;
    launching an e-mail client without a user interacting with the e-mail client; and
    passing the message file to the e-mail client to generate an e-mail including the message file, wherein the passing occurs without the user interacting with the e-mail client.

32. The method of claim 31, wherein the receiving and compressing are included portions of a video e-mail software program.

33. A video e-mail system comprising video e-mail software which, when executed, controls the combination of a self contained executable player and a video data file into a message file and forwards the message file to an e-mail client for attachment to an e-mail without a user interacting with the e-mail client, wherein the self contained executable player is configured to play the video data file when the message file is selected by a recipient of the e-mail without the recipient needing additional software.

34. The video e-mail system of claim 33, wherein the additional software includes Video for Windows.

35. The video e-mail system of claim 33, further comprising a processor which executes the video e-mail software.

36. The video e-mail system of claim 33, further comprising a camera which captures data used to generate the video data file.

37. A method of generating video clip including multimedia information captured by multimedia capture devices, the method comprising:
    receiving multimedia information captured by multimedia capture devices as a datastream from the audio and video capture devices;
    processing the multimedia information to generate a video clip having a substantially reduced size; and
    selectively attaching an executable player to the video clip to generate a message file to be attached to an e-mail without a user interacting with an e-mail client, wherein the executable player is configured to play the video clip when the message file is selected by a recipient of the e-mail.

38. A video e-mail system comprising:
    means for controlling the compression of multimedia information captured by audio or video capture devices into a video clip; and
    means for selectively combining a means for playing the video clip and the video clip to generate a message file;
    means for executing an e-mail program without interaction with the e-mail program by a user of the video e-mail system;
    means for generating an e-mail including the message file in the e-mail program without interaction with the e-mail program by the user, wherein the means for playing is configured to play the video clip when the message file is selected by a recipient of the e-mail.

39. The video e-mail system of claim 38, wherein the means for controlling further comprises means for accepting a datastream from the audio or video capture devices, and means for processing the datastream in real time to generate the video clip.

40. The video e-mail system of claim 39, wherein the video clip is substantially reduced in size.

41. The video e-mail system of claim 38, wherein the user interacts with the e-mail program to enter at least one of addressing information, a text message, subject information, and one or more additional attached files other than the message file.

42. The video e-mail software of claim 1, wherein the user interacts with the e-mail program to enter at least one of addressing information, a text message, and subject information.

43. The video e-mail software of claim 1, further comprising the video camera for creating video data.

44. The video e-mail software of claim 1, wherein the video e-mail message includes compressed multimedia data.

45. The video e-mail software of claim 1, wherein the video e-mail message includes a player configured to play the multimedia data.

46. The method of claim 37, wherein the processing of the multimedia information indudes processing the datastream in real time.

47. A method of attaching a video file to an e-mail of an e-mail computer program, the method comprising:
    executing an e-mail computer program;
    executing a video e-mail computer program; and
    executing software instructions of the video e-mail computer program which instruct the e-mail computer program to attach a video file to an e-mail.

48. The method of claim 47, wherein the executing the software instructions occurs upon receipt by the video e-mail computer program of a user instruction to generate the e-mail.

49. The method of claim 47, further comprising attaching a player to the video file configured to play video data portions of the video file when the video file is selected by a recipient of the e-mail.

50. The method of claim 47, further comprising capturing multimedia data, and compressing the multimedia data to generate at least a portion of the video file.

51. A video capture computer program which passes a data file to an e-mail client, the video capture computer program comprising:
    software instructions which create a graphical user interface configured, upon receipt of a user instruction, to create multimedia data; and
    software instructions which create agraphical user-interface configured, upon receipt of a user instruction, to pass a data file to an e-mail computer program to automatically be included in an e-mail, wherein the data file is usable by a player to play the multimedia data.

* * * * *